March 17, 1970    D. J. CRITCHELL ET AL    3,501,010

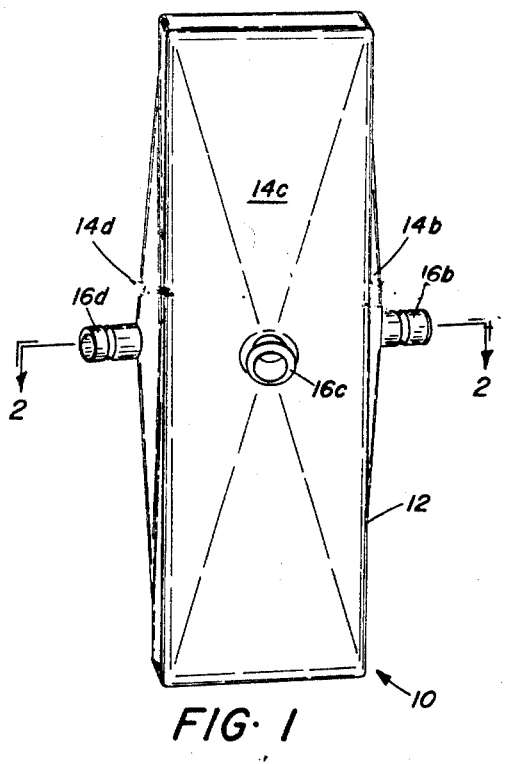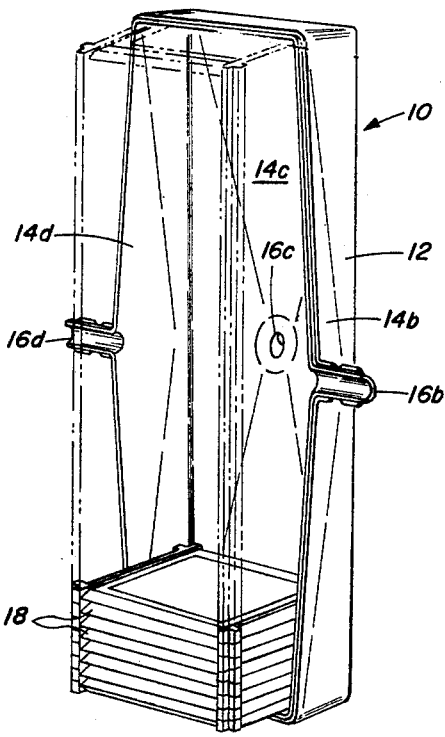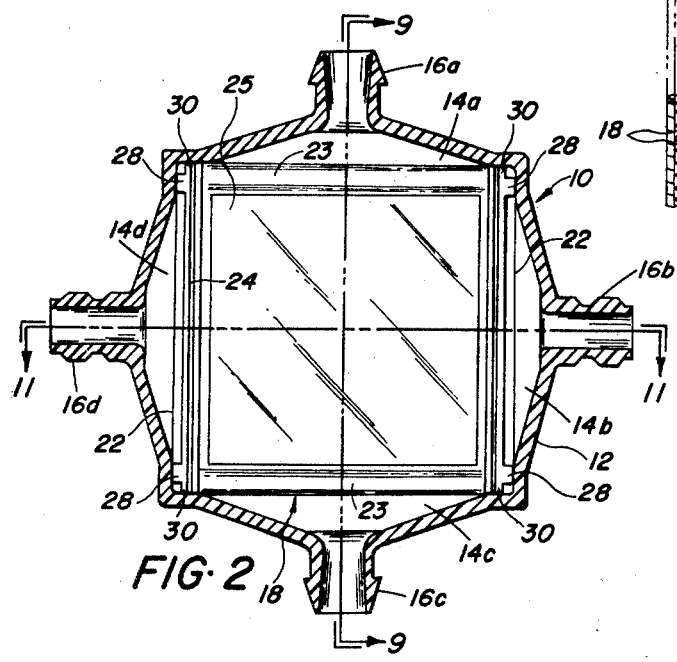
DEAN J. CRITCHELL
CHARLES W. CONROSE
CAMERON B. ESTES
INVENTORS

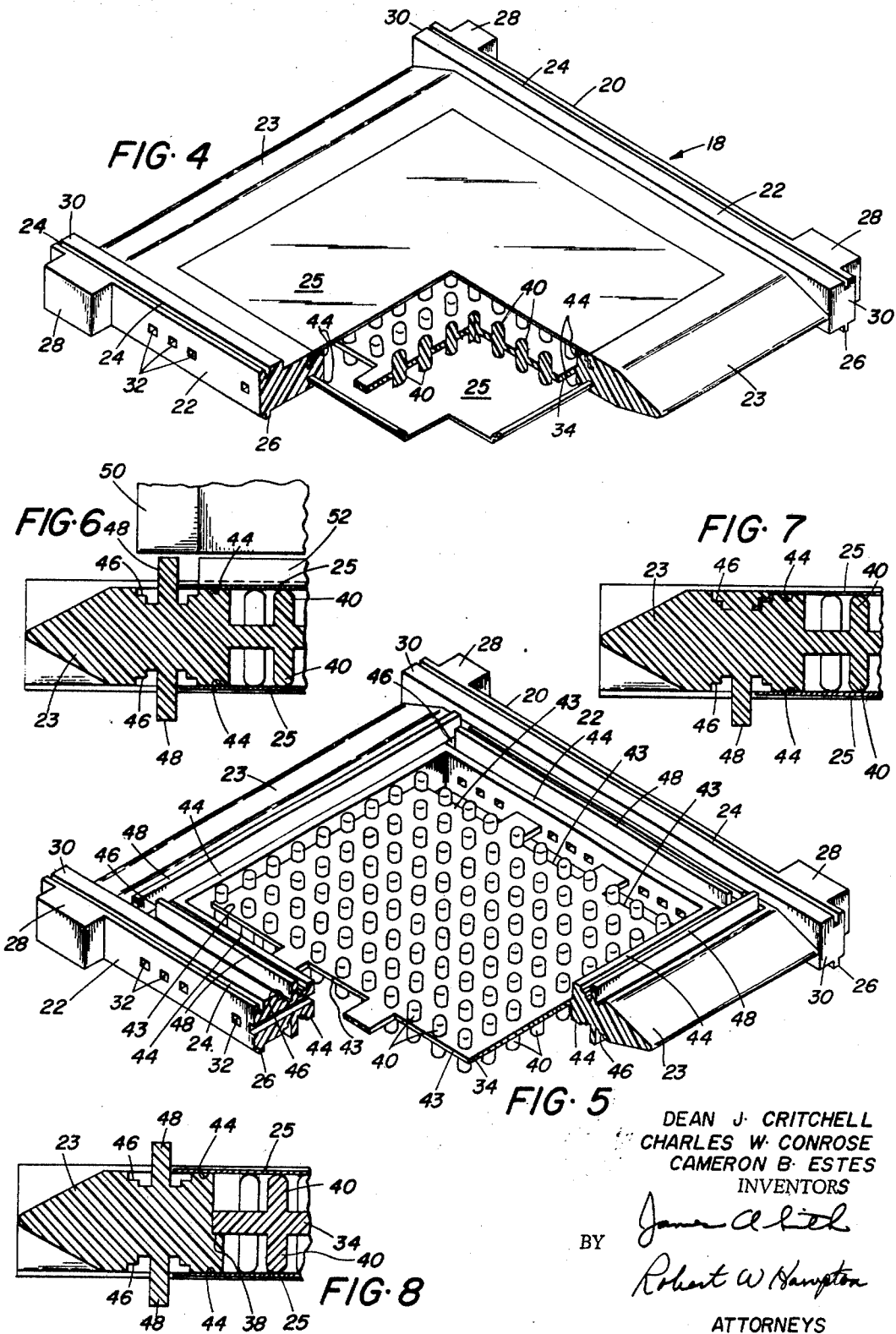

DIALYZING APPARATUS AND METHOD OF MAKING THE SAME

Filed Jan. 12, 1967    3 Sheets-Sheet 3

DEAN J. CRITCHELL
CHARLES W. CONROSE
CAMERON B. ESTES
INVENTORS

BY

ATTORNEYS

United States Patent Office 3,501,010
Patented Mar. 17, 1970

3,501,010
DIALYZING APPARATUS AND METHOD OF
MAKING THE SAME
Dean J. Critchell, Charles W. Conrose, and Cameron B.
Estes, Rochester, N.Y., assignors to Eastman Kodak
Company, Rochester, N.Y., a corporation of New
Jersey
Filed Jan. 12, 1967, Ser. No. 608,921
Int. Cl. B01d 31/00
U.S. Cl. 210—321                                  7 Claims

ABSTRACT OF THE DISCLOSURE

A dialyzer cartridge comprising a stacked assembly of dialyzing elements enclosed by a housing defining inlet and outlet manifolds. Each dialyzing element includes a frame defining perimeter segments. A plate extends between the frame segments and defines spaced projections extending from opposite sides thereof. Membranes, which have edges imbedded in the frame segments by a fusing process, engage the projections and are supported thereby.

---

This invention relates to dialyzing apparatus and more specifically to an improved dialyzing element for a dialyzer cartridge.

In copending application Ser. No. 608,784 filed on Jan. 12, 1967, by John J. Meyers et al. there is disclosed a dialyzer cartridge comprising a stacked assembly of dialyzing elements enclosed by a housing defining inlet and outlet manifolds. Each dialyzing element comprises a frame having spaced membrane walls and having openings for fluid flow through the interior of the frame in contact with the interior surfaces of said membrane walls. The dialyzing elements are stacked with the adjacent walls of adjacent elements in closely spaced relationship. The housing manifolds are effective to establish parallel flow of a first fluid between the dialyzing elements and parallel flow of a second fluid through the interiors to the elements.

In the particular embodiment of the dialyzing elements disclosed in the aforementioned application the membrane walls are formed by membrane sheets sealed at their edges to the frame segments. The membrane sheets are positioned in engagement with mesh supporting sheets which are in turn supported on suitable ribs extending between opposite perimeter segments of the frame. The mesh material serves to reinforce the membrane material and prevent excessive distortion thereof during variations in pressure of the fluid in contact therewith.

It is a principal object of this invention to provide an improved dialyzing element for a dialyzer cartridge of the general type disclosed in the aforementioned application.

Another object of the invention is to provide an improved method of fabricating a dialyzing element.

Another object of the invention is to provide an improved method of sealing the edge portion of a flexible sheet to a rigid member.

In the specific embodiment of the invention disclosed the edge portions of a thin membrane sheet are sealed to a frame by deforming raised surfaces of the frame into recesses of the frame to securely imbed the edges of the membrane in the frame. The frame is integrally molded to define surfaces for supporting the membrane and to define the raised surfaces.

Other objects and advantages will become apparent from the following description taken in connection with the accompanying drawing wherein:

FIG. 1 is a perspective view of a dialyzer cartridge;

FIG. 2 is a section taken along the line 2—2 of FIG. 1;

FIG. 3 is a perspective view of the dialyzer cartridge with one part of the housing removed;

FIG. 4 is a perspective view of a dialyzing element in accordance with the invention;

FIG. 5 is a perspective view of a membrane supporting frame in accordance with the invention;

FIGS. 6 and 7 are enlarged partial sections illustrating the method of sealing membranes to the supporting frame;

FIG. 8 is a view similar to FIG. 6 showing another embodiment of the membrane supporting member;

Figure 9:
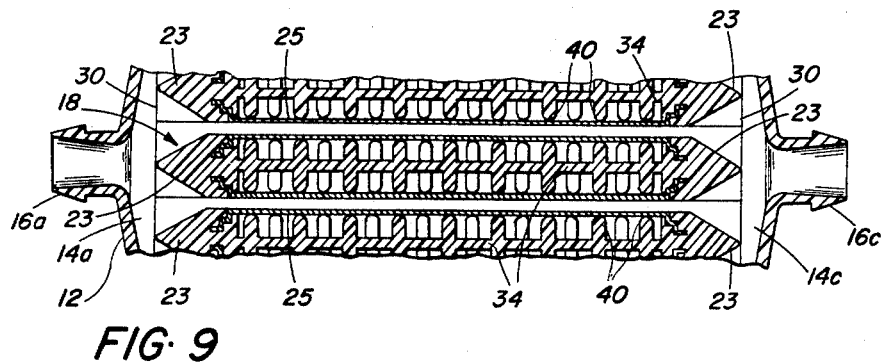
Figure 10:
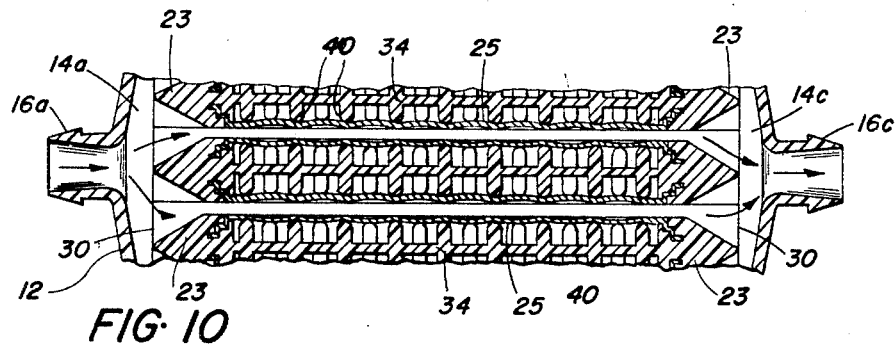
Figure 11:
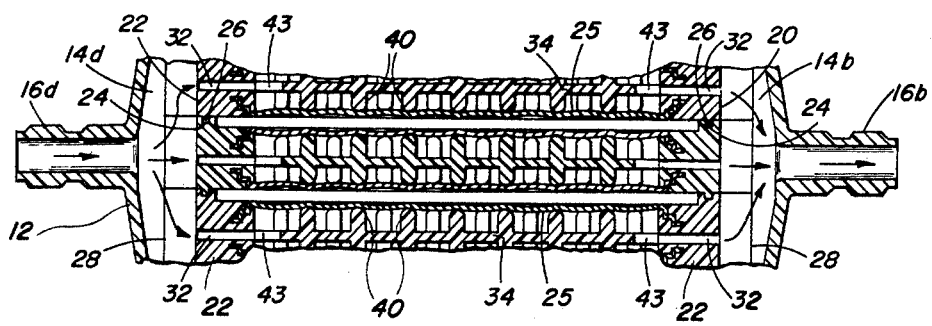

FIGS. 9 and 10 are enlarged partial sections taken along the line 9—9 of FIG. 2 showing several stacked dialyzing elements in accordance with the invention and the configuration of the membrane walls thereof in the absence of and during fluid flow through the cartridge respectively; and FIG. 11 is an enlarged partial section similar to FIG. 9 but taken along the line 11—11 of FIG. 2.

Referring to FIGS. 1, 2, and 3 of the drawings there is shown a dialyzer cartridge 10 of the general type disclosed and claimed in the aforementioned copending application. Cartridge 10 comprises a two part housing 12 of generally square cross section. The medial side wall portions of the housing 12 are slightly bulged to define a plurality of fluid manifolds 14, which are separately identified by the suffix letters a, b, c and d. The manifolds 14 are provided with fluid inlet and outlet nipples 16 also separately identified by the suffix letters a, b, c and d. As shown more clearly in FIG. 2 the inlet and outlet nipples 16 may comprise integrally formed parts having a configuration which facilitates coupling of fluid conduits thereto by suitable clamps.

As will be apparent from FIGS. 2 and 3 of the drawings the two part housing 12 comprises identical half sections defined by a longitudinal plane extending through the nipples 16b and 16d. The housing sections may be stamped or molded from suitable materials such as plastic materials and may be retained together by cementing or welding in the manner described in the aforementioned copending application.

As shown most clearly in FIG. 3, the housing 12 contains a plurality of stacked dialyzing elements 18 of relatively thin rectangular configuration. As disclosed in the aforementioned copending application, a cartridge for use as an artificial kidney may include, for example, 60 stacked dialyzing elements having planer dimensions of approximately 2 x 2 inches.

Referring specifically to FIGS. 4–7 of the drawings, each of the dialyzing elements 18 comprises a generally rectangular shaped frame 20 comprising a pair of opposite border portions or segments 22 of configuration to facilitate stacking of the dialyzing elements 18 and a pair of opposite border portions or segments 23 of identical configuration and wedge shaped to facilitate the flow of fluid between adjacent dialyzing elements 18 of the stacked assembly. A pair of semipermeable membranes 25 are sealed to opposite sides of the frame 20 to substantially enclose the frame and define membrane walls for the frame.

Referring specifically to the opposite segments 22, each segment is provided with a longitudinal groove or recess 24 in the upper surface thereof and a longitudinal tongue or depending flange 26 in the lower surface thereof. The flanges 26 on the lower surfaces of the segments 34 are complimentally arranged with respect to the grooves 24 in the upper surfaces of the segments 22 to be received by the grooves 24 of an adjacent frame upon stacking of the dialyzing elements 18 in the manner shown in FIG. 3 of the drawings. The frames 20 may be accordingly stacked together in a "tongue and groove" arrangement.

The opposite segments 22 of each frame 20 are also provided with an integral rectangular shaped abutment 28 adjacent each end portion 30 thereof. When the dialyzing elements are stacked as shown in FIG. 3 the posts 28 and the end portions 30 of adjacent frames 20 are positioned in abutting engagement to define longitudinal surfaces of the stacked assembly to which the corners of the housing 12 are sealed during assembly of the cartridge in the manner described in the aforementioned copending application. The opposite segments 22 are additionally provided with a plurality of openings 32 for the flow of fluid through each dialyzing element 18.

The opposite segments 23 are of generally wedge shaped configuration to present a minimum resistance to fluid flow between adjacent dialyzing elements 18. Moreover, the segments 23 are provided with a thickness less than that of segments 22 as disclosed in the aforementioned copending application for the purpose of establishing a predetermined space between the membrane walls of adjacent dialyzing elements to permit the flow of fluid between the stacked elements in the manner described in the aforementioned copending application.

The structure thus far described is generally the same as that disclosed and claimed in the aforementioned copending application, and reference is made to said copending application for a more complete description of the parts described above.

Referring to FIGS. 4–8 membrane supporting means comprising a thin plate member 34 is positioned within the frame 20 in a plane substantially coinciding with the centerplane of the frame 20. The plate member 34 preferably comprises an integral part of the frame 20 as shown in FIGS. 4–7. Alternatively, however, the plate member 34 may comprise a separate part fixed to the surface of a suitable inner perimeter shoulder 38 of the frame 20 such as by cementing or by appropriate welding techniques as shown in FIG. 8 of the drawings.

The plate member 34 defines a plurality of outwardly extending projections defining generally cylindrical shaped membrane supporting members 40 on opposite sides thereof. The ends of the membrane supporting members 40 on each side of the plate member 34 define a pair of spaced parallel planes and a plurality of spaced membrane supporting surfaces lying in said planes respectively. The membrane supporting members 40 are preferably formed integrally with the plate member 34 during molding of the frame 20 in the manner hereinbefore described. Alternatively, the members 40 can also be separately fabricated and cemented or welded to the plate member 34.

The opposite ends of the plate member 34 adjacent the opposite segments 22 are recessed as indicated at 43 to permit the flow of fluid from openings 32 to opposite sides of the plate member 34 or vice versa. On each side of the plate member 34 the spaced arrangement of the membrane supporting members 40 permits fluid to flow freely from one segment 22 to the other.

Referring to the method and means for sealing the membranes 25 to the frame, the upper and lower surfaces of the frame segments 22 and 23 define inner perimeter membrane supporting surfaces 44 lying in the planes defined by the ends of the membrane supporting members 40 respectively and define recesses or channel 46 having the step configuration defining shoulders as illustrated in FIGS. 6 and 7. An integrally formed central flange 48 extends from the bottom of each recess 46 and upwardly therefrom, the cross sectional area of each flange 48 being substantially equal to the cross sectional area of the recess 46. As shown in FIG. 6 the membranes 25 are positioned with their edges in close proximity to the flanges 48 and with their edge portions overlying and partially coextensive with the recesses 46 on one side of the flanges 48. Sealing of the membranes 25 may then be accomplished by bringing a tool such as indicated at 50 into engagement with the flanges 48 with a direct downward predetermined pressure to fuse and force the material of the flanges 48 into the recesses 46 as indicated in FIG. 7. As the flange material enters the recesses 46 it spreads outward to fill the recess portions on both sides thereof and imbeds the deflected edge portions of the membrane 25 as indicated in FIG. 7 to permanently retain and seal the same. The step configuration of the recess 44 causes the edge portion of the membrane 42 to assume a corresponding deflected configuration during the sealing process and insures formation of a tight seal and permanent anchoring of the membrane edge portions.

The positioning of the flanges in the center of each recess is an important feature in that it permits flow of the flange material to both sides of the flanges and permits direct downward pressure to be applied to the flanges during the fusing operation. This even distribution of the fused flange material results in the smooth finish surface formed by the substantially coplanar relationship of the exposed portion of the sealed membrane 25 and the side surfaces of frame segments 22 and 23, as shown in FIG. 7. As described in the aforementioned copending application, the smooth exterior surface of the dialyzing elements and the wedge-shaped frame segments 23 minimize the flow resistance and, in the case of blood, achieve a uniform flow without the turbulence or shearing effects inherent in the prior art kidneys.

The recess 44 and flange 46 are integrally formed to the configuration shown in FIG. 6 during the molding of the frame 20 and the plate member 34. Thus in fabrication of a dialyzing element embodying the invention the frame 20 may be molded or otherwise formed to the configuration shown in FIG. 4. It is then only necessary to place the membrane material in the position indicated in FIG. 6 and engage the flanges 48 with a tool to complete the dialyzing element. It will be apparent to those skilled in the art that the membranes may be sealed to the opposite sides of the frame 20 in a single operation by simultaneously bringing a pair of tools into engagement with the flanges 48 on the opposite sides of the frame.

The frame 20 is preferably formed from plastic material and the flanges 48 are engaged by a heated tool which melts the flanges and causes the flange material to substantially fill the recesses 46 as shown in FIG. 7. To protect the adjacent portions of the membranes 25 from heat damage a heat conductor 52 may be placed in contact with the membranes 25 as indicated in FIG. 6.

As an alternative method of sealing the edges of the membranes, the flanges 48 may be deformed into the recesses 46 by the application of ultrasonic vibrations thereto. Specifically a tool similar to the tool 50 may be vibrated at a suitable ultrasonic frequency and caused to engage the flanges 48 with a predetermined pressure to effectively deform or fuse the flange material into the recesses. Suitable ultrasonic techniques for accomplishing this are well known to those skilled in the art and further description is deemed to be unnecessary.

A plurality of dialyzing elements 18 fabricated in the above manner may be stacked and sealed in the housing 12 in the manner described in the aforementioned copending application. The stacked assembly is preferably sealed at its corners in the manner described in said application so that a fluid supplied to one of the manifolds 14a and 14c will be circulated through the spaces between adjacent dialyzing elements to the opposite manifold and a fluid supplied to one of the manifolds 14b and 14d will pass through the hollow interiors of the dialyzing elements 18 to the opposite manifold. If the cartridge is employed as an artificial kidney blood is preferably circulated between the dialyzing elements and dialyzant through the elements.

As shown in FIG. 9 of the drawings, during the absence of fluid flow through the cartridge, the spaced projections 40 serve to support the membranes 25 and maintain the flat configuration thereof. During fluid flow conditions the membranes 25 will deform slightly between the spaced projections in response to blood pressure as indicated in FIGS. 10 and 11.

We claim:

1. A dialyzing element for a dialyzer cartridge adapted to contain a plurality of stacked dialyzing elements arranged for the flow of a first fluid through each element and the flow of a second fluid between the sides of adjacent elements, said element comprising:

a frame; and semipermeable membranes disposed on opposite sides respectively of said frame, the edge portions of said membranes being deflected and permanently imbedded in said opposite sides respectively to seal said edge portions to said frame and enclose the interior of the frame, said opposite sides and the exposed portions of the membranes presenting substantially smooth coplanar surfaces to facilitate the uniform flow of said second fluid between adjacent elements.

2. A dialyzing element for a dialyzing cartridge adapted to contain an assembly of stacked dialyzing elements arranged for the flow of a first fluid through each element and the flow of a second fluid between the sides of adjacent elements, comprising:

a rectangularly shaped frame of plastic material defining a first pair of opposite frame segments of configuration to facilitate stacking of the elements in spaced relationship and defining a second pair of opposite wedge-shaped segments to facilitate the uniform flow of said second fluid between the said adjacent elements, and semipermeable membranes disposed on opposite sides respectively of said frame, the edge portions of said membranes being permanently imbedded in said opposite sides respectively, said opposite sides and the exposed portion of said membranes presenting substantially smooth coplanar surfaces to further facilitate the uniform flow of said second fluid between said adjacent elements.

3. A dialyzing element in accordance with claim 2 wherein both sides of said frame have recesses therein, wherein said edge portions of said membranes are positioned within said recesses, and wherein said edge portions of said membranes are retained in said recesses by integral parts of said frame bounding said recesses and thermally deformed into said recesses on top of said edge portions.

4. A method of making a dialyzing element for a dialyzing cartridge which includes the steps of:

molding an integral plastic frame to form an elongated recess in the side surface of said frame along the perimeter thereof, and on integral flange along said recess extending from the bottom of the recess;

positioning a sheet of semipermeable membrane material on said side surface of the frame with the perimeter edge portions of the membrane coextensive with at least a portion of the width of the recess and in close proximity to the flange; and heating and applying pressure to the flange to deform the same into the recess to fill the same and to imbed the edge portions of the sheet in the recess under the flange material.

5. The invention of claim 4 wherein the flanges are heated by ultrasonic vibrations.

6. The invention of claim 4 wherein the said recess is formed with a cross sectional configuration defining at least one shoulder on at least one side thereof and the edge portions of the membranes are deflected into engagement with said one side of said flange surface.

7. A method of making a dialyzing element for a dialyzing cartridge which includes the steps of:

molding an integral plastic frame to form an elongated recess in opposite side surfaces of said frame and extending along the perimeter thereof, and an integral raised surface along respective recesses;

positioning semipermeable membranes on opposite sides respectively of said frame, the edge portions of said membranes being coextensive with at least a portion of the width of said recesses and in close proximity to said raised surfaces; and heating and simultaneously applying pressure to the raised surfaces to deform the material of the raised surfaces into their respective recesses to fill the same and to imbed the edge portions of the membranes into the side surfaces of said frame.

References Cited

UNITED STATES PATENTS

| | | | |
|---|---|---|---|
| 2,225,024 | 12/1940 | Weber | 23—252 |
| 2,444,147 | 6/1948 | Walton | 210—486 |
| 2,664,395 | 12/1953 | Marchand | 210—321 |
| 2,982,416 | 5/1961 | Bell | 210—321 |
| 3,051,316 | 8/1962 | MacNeill | 210—321 |
| 3,266,629 | 8/1966 | Megibow | 210—321 |
| 3,342,719 | 9/1967 | Chen et al. | 210—321 X |
| 3,369,343 | 2/1968 | Robb | 55—158 X |
| 2,061,505 | 11/1936 | Collins | 210—321 |
| 3,399,018 | 8/1968 | Leblanc | 264—249 X |

REUBEN FRIEDMAN, Primary Examiner

F. A. SPARK, JR., Assistant Examiner

U.S. Cl. X.R.

210—346, 486; 264—249